United States Patent
Nagao

(10) Patent No.: US 6,532,003 B2
(45) Date of Patent: *Mar. 11, 2003

(54) DATA PROCESSING APPARATUS HAVING CONTROL ELEMENT FOR DETECTING FALSE TOUCH

(75) Inventor: Naoyuki Nagao, Tokyo (JP)

(73) Assignee: Fujitsu Takamisawa Component Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,846

(22) Filed: Jul. 24, 1998

(65) Prior Publication Data

US 2002/0190959 A1 Dec. 19, 2002

(30) Foreign Application Priority Data

Jan. 8, 1998 (JP) .......................... 10-002603

(51) Int. Cl.⁷ ................................. G09G 5/00
(52) U.S. Cl. ...................... 345/168; 345/173
(58) Field of Search ................ 345/174, 173, 345/175, 176, 177, 178, 179, 180, 182, 183, 168, 169, 157, 158, 160, 905; 341/22

(56) References Cited

U.S. PATENT DOCUMENTS

| | | | | |
|---|---|---|---|---|
| 4,868,912 A | * | 9/1989 | Doering | 345/175 |
| 5,621,437 A | * | 4/1997 | Joeng | 345/173 |
| 5,666,113 A | * | 9/1997 | Logan | 341/34 |
| 5,748,185 A | * | 5/1998 | Stephan et al. | 345/173 |
| 5,760,715 A | * | 6/1998 | Senk et al. | 341/33 |
| 5,802,544 A | * | 9/1998 | Combs et al. | 711/5 |
| 5,861,874 A | * | 1/1999 | Joto | 345/173 |
| 5,914,703 A | * | 6/1999 | Herng-Chuen | 345/157 |
| 5,917,475 A | * | 6/1999 | Kuzunuki et al. | 345/173 |
| 5,943,506 A | * | 8/1999 | Poisner | 395/868 |
| 5,963,199 A | * | 10/1999 | Kato et al. | 345/179 |
| 5,990,872 A | * | 11/1999 | Jorgenson et al. | 345/168 |
| 6,011,541 A | * | 1/2000 | Klein | 345/156 |
| 6,011,544 A | * | 1/2000 | Sato | 345/168 |
| 6,018,336 A | * | 1/2000 | Akiyama et al. | 345/173 |
| 6,029,214 A | * | 2/2000 | Dorfman et al. | 710/73 |
| 6,037,929 A | * | 3/2000 | Ogura et al. | 345/168 |
| 6,088,023 A | * | 7/2000 | Louis et al. | 345/173 |

FOREIGN PATENT DOCUMENTS

| | | | |
|---|---|---|---|
| JP | 36119228 | * | 8/1986 |
| JP | 61-193228 | | 8/1986 |
| JP | 1-187623 | | 7/1989 |
| JP | 2-8923 | | 1/1990 |
| JP | 8-234907 | | 9/1996 |

* cited by examiner

Primary Examiner—Richard Hjerpe
Assistant Examiner—Kevin M. Nguyen
(74) Attorney, Agent, or Firm—Staas & Halsey LLP

(57) ABSTRACT

A data processing apparatus includes a coordinate detecting device outputting coordinate data of a touch point generated by a touch on a coordinate input panel, a keyboard outputting key entry data and a processor executing predetermined processes corresponding to the coordinate data and the key entry data. The data processing device further includes a control element detecting false coordinate data generated by a false touch on the coordinate input panel during a key entry operation and for controlling key entry data other than the false coordinate data as valid data.

9 Claims, 12 Drawing Sheets

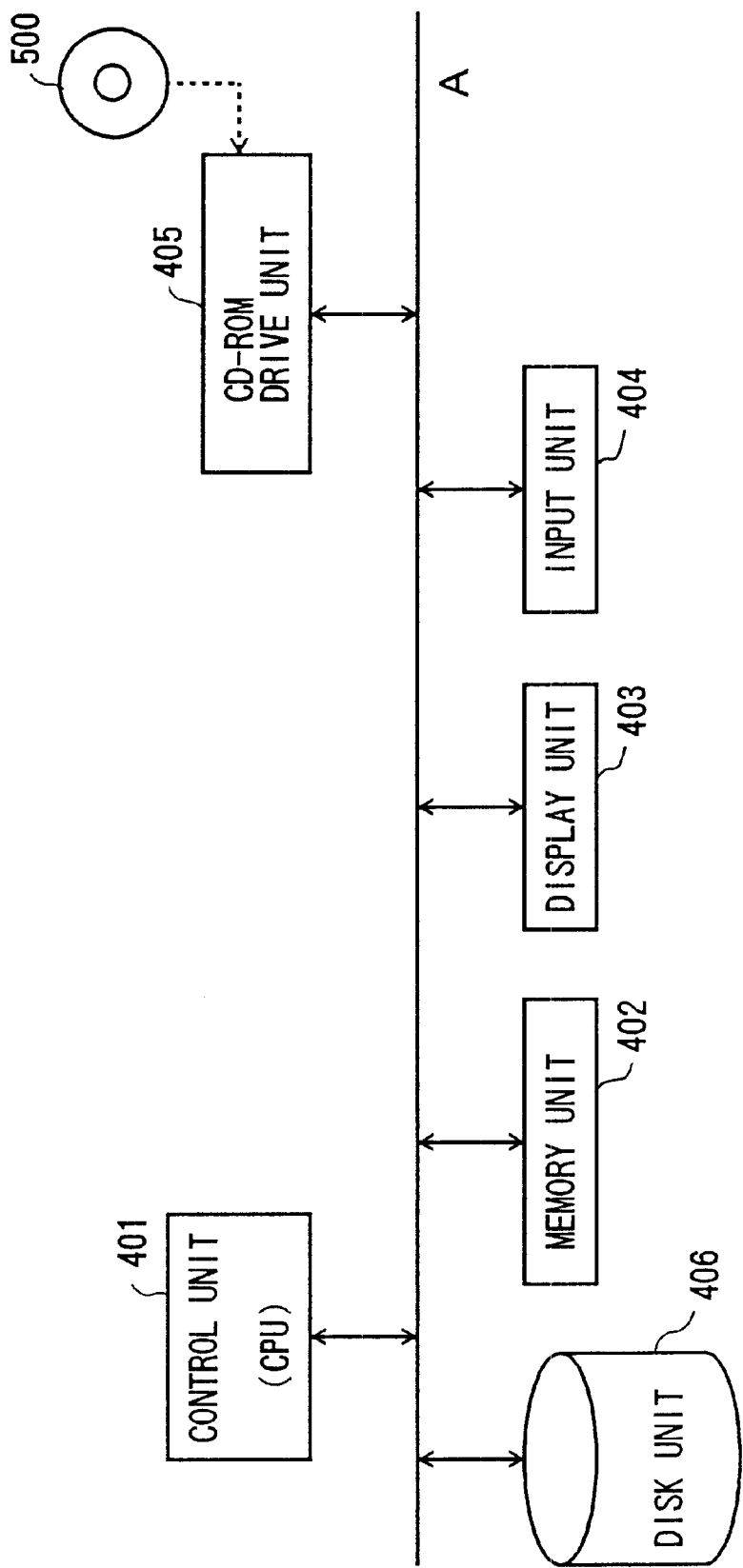

DATA PROCESSING APPARATUS HAVING CONTROL ELEMENT FOR DETECTING FALSE TOUCH

BACKGROUND OF THE INVENTION

1. Field of the Invention

The present invention generally relates to a data processing apparatus having a coordinate detecting device for outputting coordinate data of a touch point upon a touch on a coordinate input panel and a keyboard for outputting key entry data, and particularly relates to a data processing apparatus which can execute predetermined processes corresponding to the data.

2. Description of the Related Art

A mouse is one of the most popular pointing devices used with a data processing apparatus. However, the mouse is inconvenient for use with a data processing apparatus such as a portable personal computer or a word processor which is often used outdoors or in a car, where no flat work surfaces are available. Recently, a coordinate detecting device is coming into use in place of the mouse so as to satisfy a need for a pointing device that does not require any work surface. A coordinate detecting device of a voltage detecting type using a coordinate input panel is easy to adapt to a graphical user interface, easy to operate, and has a long life. Also, such a coordinate detecting device has a simple structure and a better cost effectiveness. Accordingly, the coordinate detecting device of the voltage detecting type has become of a greater interest as a device for inputting data to a data processing apparatus such as a portable personal computer.

The coordinate detecting device may be built-in to a data processing apparatus such as a portable personal computer. Since such a coordinate detecting device is used very frequently, the coordinate detecting device may be provided at the bottom of the keyboard. Therefore, the coordinate input panel may be falsely touched when operating the keyboard positioned above the coordinate input panel. This false touch may cause problems such as an offset of a key entry position and processing of invalid coordinate data. This may lead to a crucial trouble under a certain condition.

Accordingly, there is a need for a data processing apparatus which can invalidate unnecessary data from the coordinate input device.

Referring to the drawings, a data processing apparatus of the related art will be described which executes predetermined processes corresponding to coordinate data from the coordinate detecting device and key entry data from the keyboard.

FIG. 1 shows a principle structure of a data processing apparatus of the related art. As shown in FIG. 1, the data processing apparatus of the related art includes a hardware layer and a software layer. The hardware layer receives data generated by an operation of the user, which may be referred to as coordinate data and key entry data. The software analyzes the received data and then executes predetermined processes corresponding to the data.

The above-described hardware layer includes a coordinate detecting device 301 for generating coordinate data by a touch on a coordinate input panel, a keyboard 302 for generating key entry data by pressing down a key of the keyboard 302, an I/O controller 303 for communicating the data from the coordinate detecting device 301 and the keyboard 302 to the software layer.

The software layer includes a mouse driver 304 and a keyboard driver 305. The mouse driver 304 converts the coordinate data from the hardware layer into valid data corresponding to an operating system 306 and an application 307. The keyboard driver 305 converts the key entry data into valid data corresponding to the operating system 306 and the application 307.

When there is a touch on the coordinate input panel by the user, the coordinate detecting device 301 detects voltages as shown in FIG. 2A, so that it is determined whether or not there is a touch on the coordinate input panel. Further, the coordinate detecting device 301 creates coordinate data according to the operation by the user in a real-time manner, and communicates the coordinate data to the mouse driver 304 via the I/O controller 303. The operating system 306 and the application 307 control operations, such as an operation of a cursor, based on valid coordinate data from the mouse driver 304.

Also, when the user touches the coordinate input panel as shown in FIG. 2B, after a predetermined period has elapsed, the coordinate detecting device 301 determines this touch as command data input equivalent to a click of a button of a mouse. Further, when the user touches the coordinate input panel as shown in FIG. 2C, after a predetermined period has elapsed, the coordinate detecting device 301 determines this touch as command data input equivalent to a double-click of a button of a mouse.

The coordinate detecting device 301 communicates the command data to the mouse driver 304 via the I/O controller 303. The operating system 306 and the application 307 control operations, such as an execution of a program and a menu selection, based on valid command data from the mouse driver 304.

When the user presses down a key of the keyboard 302, the keyboard 302 communicates the key entry data to the keyboard driver 305 via the I/O controller 303. The operating system 306 and the application 307 control operations, such as an input of characters and an execution of programs, based on valid key entry data from the keyboard driver 305.

As described above, the data processing apparatus of the related art executes predetermined processes corresponding to the coordinate data from the coordinate detecting device 301 and according to the key entry data from the keyboard 302, in a parallel manner.

However, in the data processing apparatus of the related art, coordinate data of the touch point may be automatically created even in case when there is a false touch on a coordinate detecting device by the user during a key entry operation. Further, predetermined processes corresponding to such false coordinate data may be executed. That is to say, the hardware is not capable of recognizing whether the touch to the coordinate input panel is false or not.

Thus, problems such as an offset of a key entry position or a position of the cursor, and execution of an irrelevant program may lead to a crucial trouble under a certain condition.

SUMMARY OF THE INVENTION

Accordingly, it is a general object of the present invention to provide a data processing apparatus which can solve the problems described above.

It is another and more specific object of the present invention to provide a data processing apparatus which can detect a touch on the coordinate input panel during a key entry operation.

In order to achieve the above objects, a data processing apparatus includes a coordinate detecting device outputting coordinate data of a touch point generated by a touch on a coordinate input panel, a keyboard outputting key entry data, a processor executing predetermined processes corresponding to the coordinate data and the key entry data and a control element detecting false coordinate data generated by a false touch on said coordinate input panel during a key entry operation and for controlling key entry data other than said false coordinate data as valid data.

In the data processing apparatus described above, even in a case when coordinate data of the touch point is automatically created from a false touch on the coordinate input panel by the user during a key entry operation, the false coordinate data may be detected at the control element. Accordingly, predetermined processes corresponding to such false coordinate data will not be executed. Therefore, there will not be problems such as an offset of a key entry position or a position of the cursor, and execution of an irrelevant program.

It is still another object of the present invention to provide a data processing apparatus which can detect false coordinate data created by a false touch on the coordinate detecting device during key entry operation, invalidate unnecessary coordinate data and process key entry data other than the false coordinate data as valid coordinate data.

In order to achieve the above object, the control element includes a receiving element for receiving both the key entry data from said keyboard and the coordinate data from said coordinate detecting device, a time monitoring element for monitoring a keystroke time interval of said keyboard and a touch period of said coordinate detecting device and a determination element for determining whether the coordinate data from said coordinate detecting device during a key entry operation is valid coordinate data on the basis of the keystroke time interval and the touch period. The processor receives the valid coordinate data and executes corresponding processes.

Also, computer program products are provided which can achieve the above objects. Other objects and further features of the present invention will be apparent from the following detailed description when read in conjunction with the accompanying drawings.

BRIEF DESCRIPTION OF THE DRAWINGS

FIG. 12 is a block diagram showing an entire structure of a data processing apparatus according to the present invention.

DETAILED DESCRIPTION OF THE PREFERRED EMBODIMENTS

In the following, a principle and embodiments of the present invention will be described with reference to the accompanying drawings.

Figure 1:
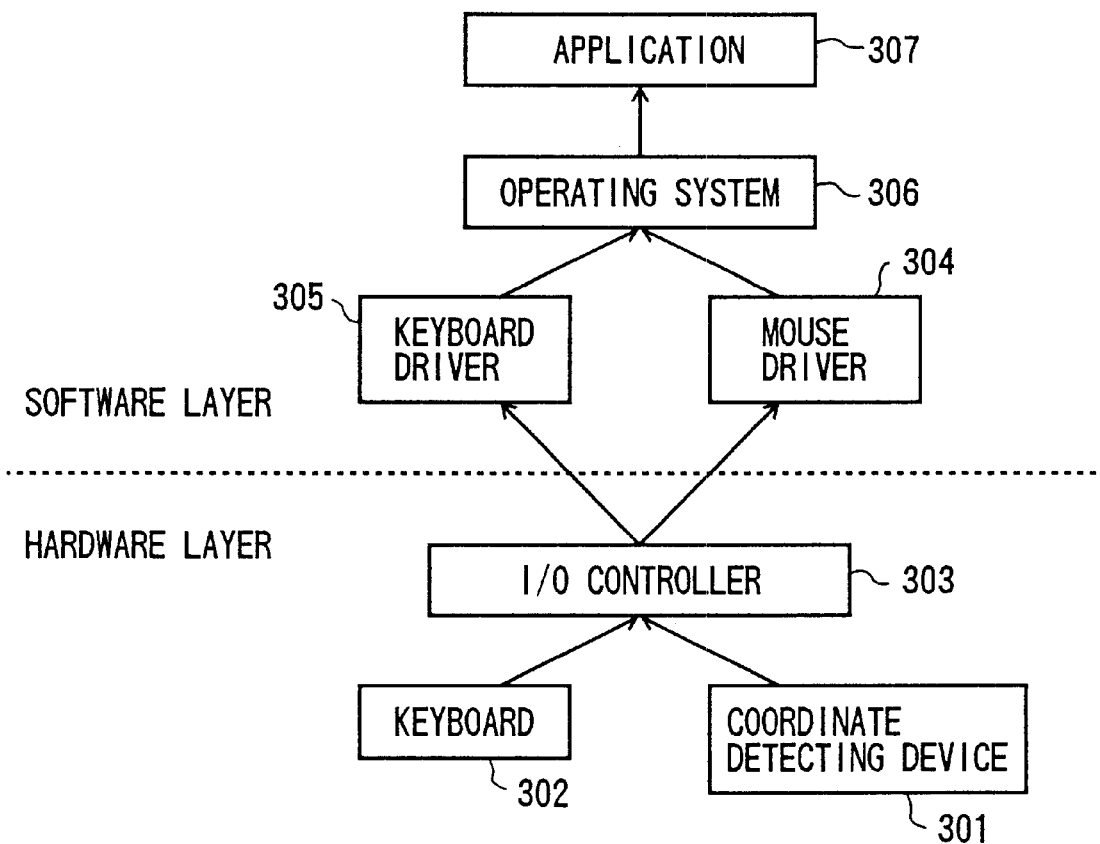
FIG. 1 is a block diagram showing a data processing apparatus of the related art.
Figure 2A:
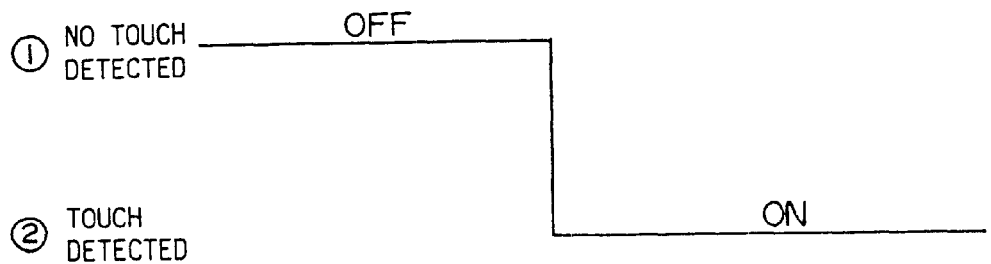
FIGS. 2A to 2C are diagrams showing an operation of the data processing apparatus of the related art.
Figure 2B:
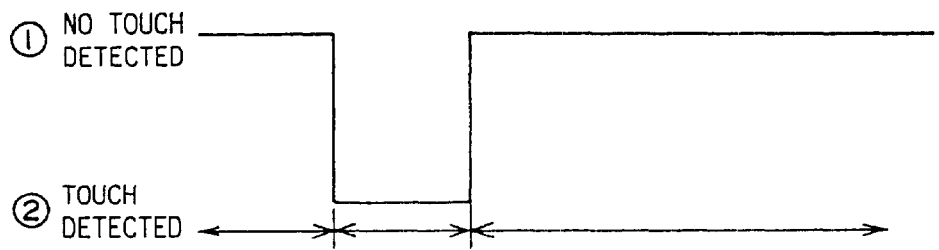
Figure 2C:
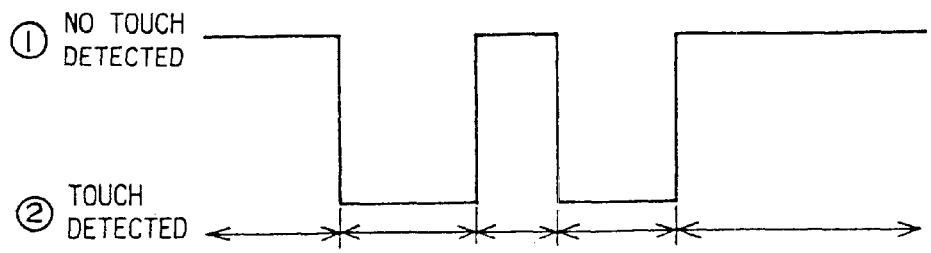
Figure 3:
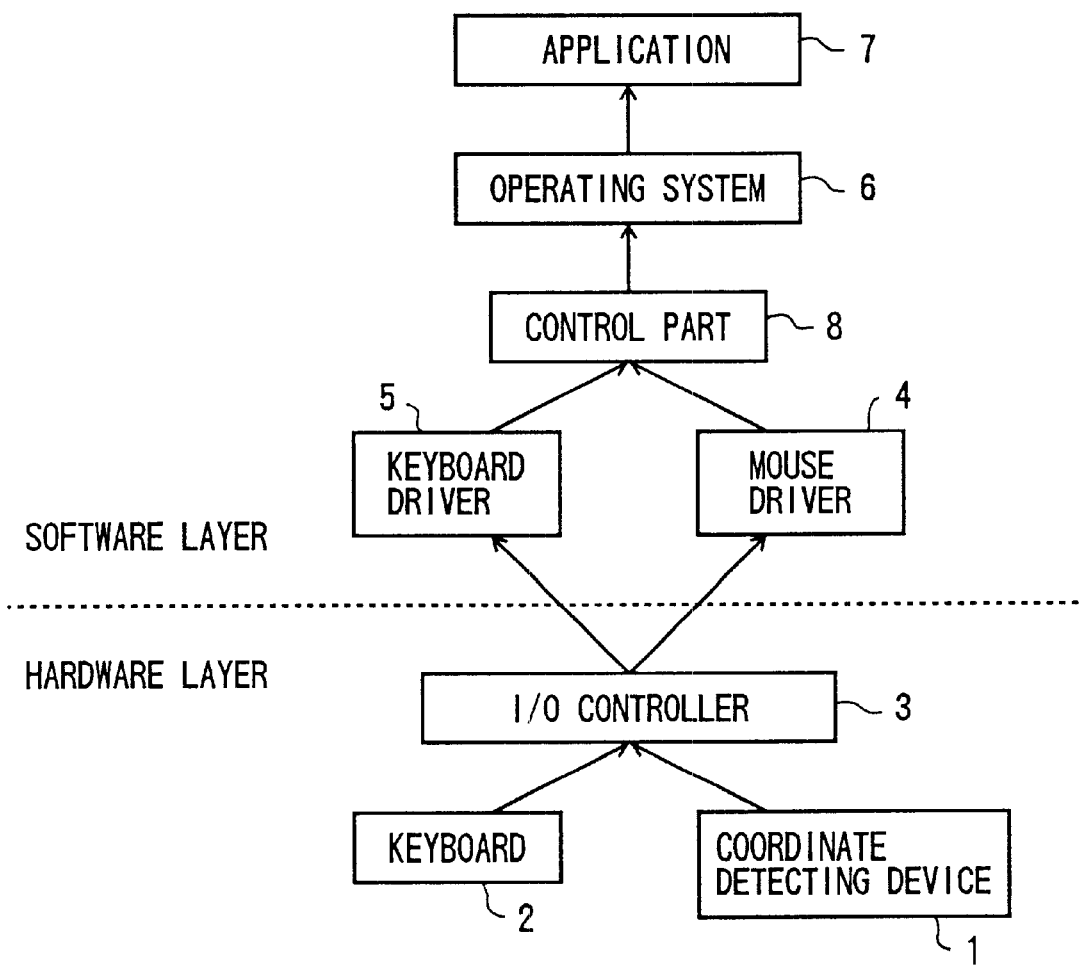
FIG. 3 is a block diagram showing a first embodiment of a data processing apparatus according to the present invention.

FIG. 3 is a block diagram showing a first embodiment of a data processing apparatus according to the present invention. As shown in FIG. 3, the data processing apparatus includes a hardware layer and a software layer. The hardware layer receives data generated by an operation of the user, which may be referred to as coordinate data and key entry data. The software analyzes the received data and then executes predetermined processes corresponding to the data.

The above-described hardware layer of the present invention includes a coordinate detecting device 1 for generating coordinate data by a touch on a coordinate input panel, a keyboard 2 for generating key entry data by pressing down a key of the keyboard 2, an I/O controller 3 for communicating the data from the coordinate detecting device 1 and the keyboard 2 to the software layer.

The software layer includes a mouse driver 4, a keyboard driver 5 and a control part 8. The mouse driver 4 converts the coordinate data from the hardware layer into valid data corresponding to an operating system 6 and an application 7. The keyboard driver 5 converts the key entry data into valid data corresponding to the operating system 6 and the application 7. The control part 8 receives coordinate data and key entry data from the respective drivers (the mouse driver 4 and the keyboard driver 5) and invalidates unnecessary coordinate data originating from the coordinate detecting device 1.

Also, for invalidating unnecessary coordinate data from the coordinate detecting device 1, the control part 8 detects false coordinate data created by a false touch on the coordinate input panel during a key entry operation and controls key entry data other than the false coordinate data as valid data.

Figure 4:
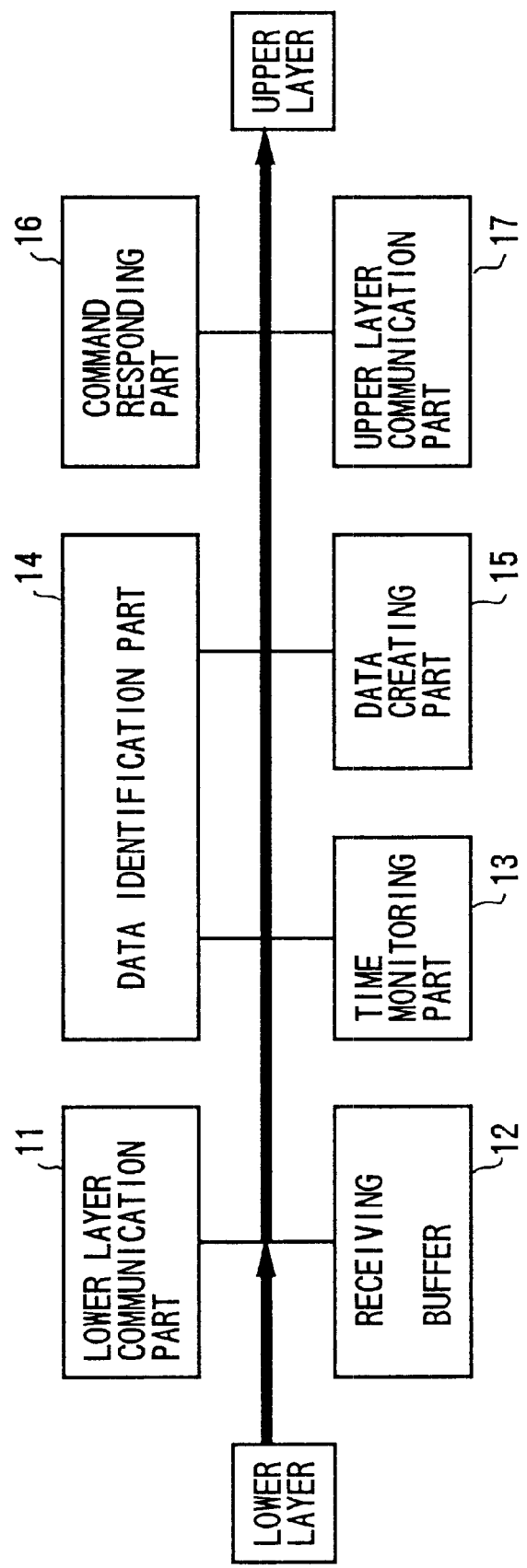
FIG. 4 is a block diagram showing a control part according to the present invention.

Now, referring to FIG. 4, the control part 8 will be described in detail. In order to achieve the above-described control, the control part 8 includes a lower layer communication part 11, a receiving buffer 12, a time monitoring part 13, a data identification part 14, a data creating part 15, a command responding part 16 and an upper layer communication part 17. Functions of each of the elements constructing the control part 8 will be described below.

The lower layer communication part 11 controls communications between lower layer drivers, such as the mouse driver 4 and the keyboard driver 5, and the control part 8.

The receiving buffer 12 receives both the coordinate data from the coordinate detecting device 1 and the key entry data from the keyboard 2.

The time monitoring part 13 measures time intervals between keystrokes of the keyboard 2 and a time period during which the coordinate detecting device 1 generates coordinate data, based on the coordinate data and the key entry data received by the receiving buffer 12. The details of the time interval and the time period will be described later.

According to the above-described time interval and time period, the data identification part 14 determines whether or not the coordinate data from the coordinate detecting device during the key entry operation is valid. Criteria for determination will be described later.

The data creating part 15 creates transmission data according to the key entry data and the coordinate data which have been determined to be valid by the data identification part 14.

The command responding part 16 creates command data by recognizing commands from the coordinate detecting device 1 and from the keyboard 2.

The upper layer communication part 17 controls communications between the lower layer drivers, such as the mouse driver 4 and the keyboard driver 5, and the control part 8.

By having a structure and functions as shown above, the data processing apparatus of the present invention can detect coordinate data created by a false touch in the control part 8 even when there has been a false touch on the coordinate input panel during a key entry operation and thus false coordinate data has been automatically created. Therefore, a predetermined process corresponding to the false coordinate data is not executed. In other words, the data processing apparatus of the present invention is capable of recognizing a touch on the coordinate input panel during a key entry operation.

Figure 10:
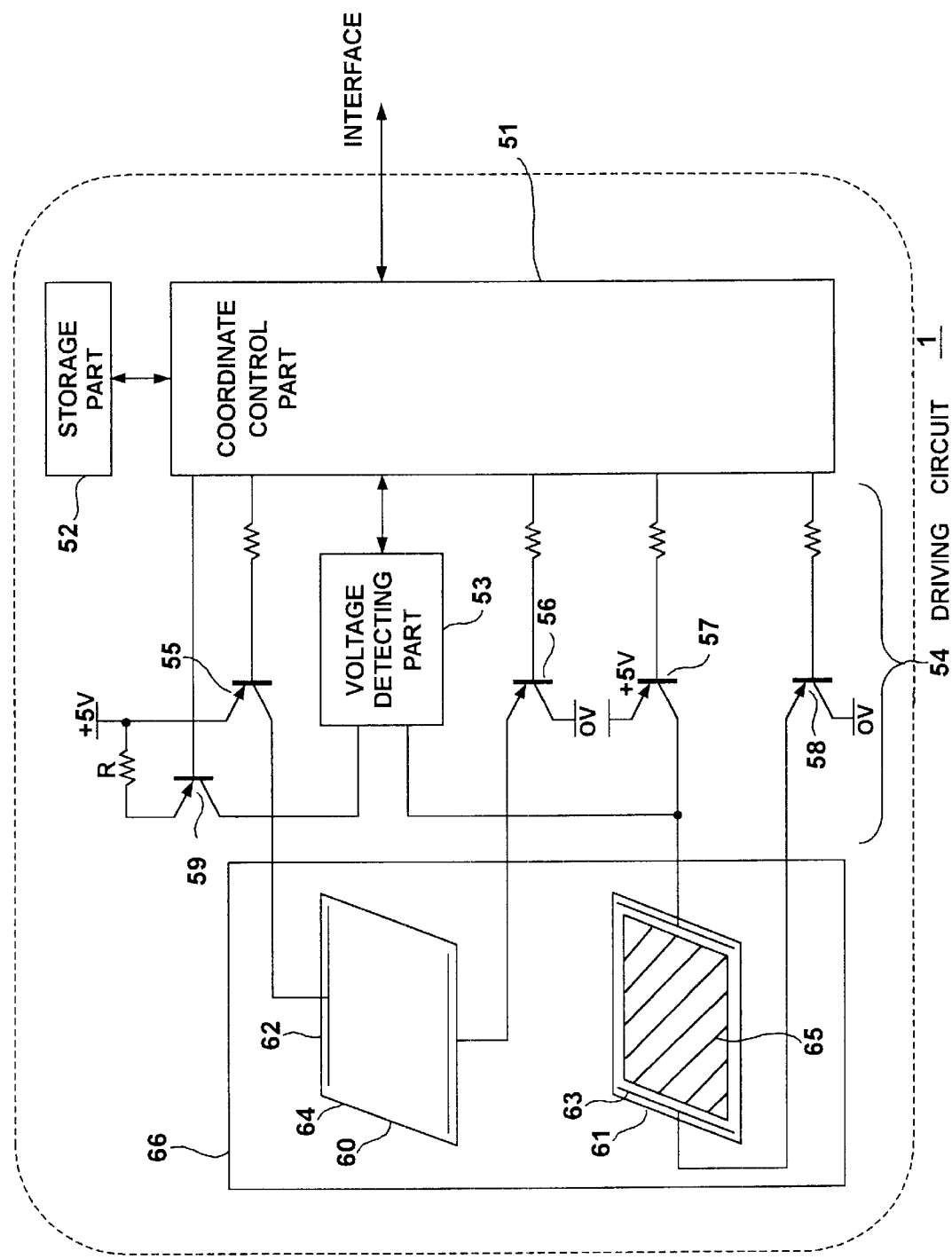
FIG. 10 is a schematic diagram showing a coordinate detecting device used in a data processing apparatus of the present invention.

Referring to FIG. 10, the coordinate detecting device 1 used in the data processing apparatus of the present invention will be described in detail with respect to its structure, function and processing operation.

The coordinate detecting device 1 includes a coordinate input panel 66 having a touch surface to be touched by the user of the data processing apparatus using a cordless pen or his finger, a driving circuit 54 for applying voltages to the coordinate input panel 66, a coordinate control part 51 for controlling the driving circuit 54, a voltage detecting part 53 for detecting a voltage value and a storage part 52 for storing coordinate data corresponding to the detected voltage value. Thus, when the touch surface of the coordinate input panel 66 is touched by a cordless pen or one's finger, the coordinate detecting device 1 outputs a command corresponding to a command generated by a button of a mouse and coordinate data indicating a touch point, which may be indicated as a cursor, operating on the coordinate input panel 66.

Still referring to FIG. 10, the coordinate input panel 66 includes two conductor layers 60 and 61 opposing each other with a gap there between. The conductor layers 60 and 61 have a respective pair of electrodes placed at the peripheral part such that central input areas 64 and 65 are positioned between the pairs of electrodes 62 and 63, respectively. Also, the conductor layers 60 and 61 are placed such that the pairs of electrodes 62 and 63 provided thereon are orthogonal.

For example, the pair of electrodes 63 on the conductor layer 61 which are parallel to the Y-axis may be used for detecting an X-coordinate and the pair of electrodes 62 on the conductor layer 60 which are parallel to the X-axis may be used for detecting a Y-coordinate.

The driving circuit 54 includes transistors 55 and 56 for applying voltages between the pair of electrodes 62 on the conductive layer 60 and transistors 57 and 58 for applying voltages between the pair of electrodes 63 on the conductive layer 61. Voltages are applied to the conductor layers 60 and 61 by alternately switching on pairs of transistors 55, 56 and transistors 57, 58.

Also, the driving circuit 54 includes a circuit provided by a resistance R and a transistor 59 for sensing whether there is any contact between the conductor layers 60 and 61.

The coordinate control part 51 retrieves coordinate data or commands from the storage part 52, which correspond to the voltage value corresponding to the X-coordinate and the Y-coordinate of the touch point obtained at the voltage detecting part 53. Then, the coordinate control part 51 outputs the thus-obtained coordinate data or commands to the I/O controller 3. Also, the coordinate control part 51 controls the transistors 55, 56, 57 and 58 so as to alternately apply driving voltages to the conductive layers 60 and 61.

Figure 11:
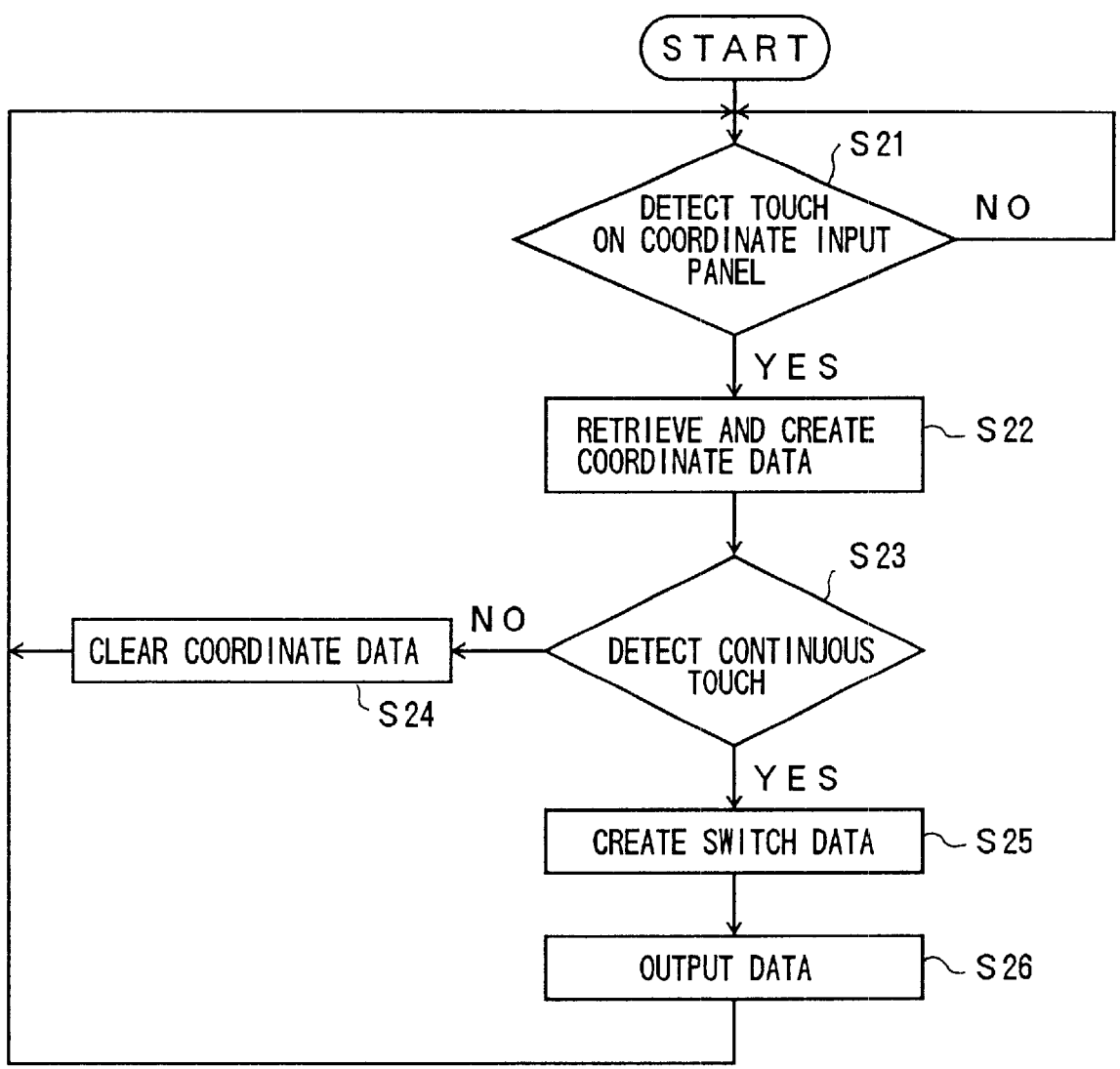
FIG. 11 is a flowchart showing an operation of a coordinate detecting device used in a data processing apparatus of the present invention.

Referring to FIG. 11, an operation of the coordinate detecting device 1 having the above structure will be described in detail focused on an output process of coordinate data and commands to the I/O controller 3. For convenience, a "step" will be denoted as an "S" in the following description and in the Figure.

In S21, it is determined whether there is a touch on the coordinate input panel 66. It is assumed that initially there is no touch on the coordinate input panel 66 (S21, NO). When the user presses the coordinate input panel 66, the two conductor layers 60 and 61 come in contact with each other at the touch point pressed by the user. First, when a voltage is applied to the pair of electrodes 62, the voltage will be divided at the touch point and a voltage value Vl indicating the X-coordinate is output via the pair of electrodes 63. Next, when a voltage is applied to the pair of electrodes 63, the voltage will be divided at the touch point and a voltage value V2 indicating the Y-coordinate is output via the pair of electrodes 62. Then, the voltage detecting part 53 detects the voltage value V1 indicating the X-coordinate and the voltage value V2 indicating the Y-coordinate (S21, YES).

The coordinate control part 51 retrieves and creates coordinate data from the storage part 52 according to the voltage values corresponding to the X-coordinate and the Y-coordinate obtained at the voltage detecting part 53 (S22).

Then, the coordinate control part 51 repeatedly checks the voltage values corresponding to the X-coordinate and the Y-coordinate sent from the voltage detecting part 53 so as to determine whether the detected touch is continuous (S23).

If the detected touch is not continuous (S23, NO), the coordinate control part 51 clears the coordinate data created in S22 (S24), and waits for a subsequent touch.

If the detected touch is continuous (S23, YES), the coordinate control part 51 creates switch data formed by a command corresponding to a command generated by a button of a mouse and coordinate data indicating a touch point, which may be indicated as a cursor, operating on the coordinate input panel 66 (S25). Finally, the coordinate control part 51 outputs the switch data to the above-described I/O controller 3 (S26).

Here, the data processing apparatus of FIG. 3 is considered which includes the coordinate detecting device 1 for outputting coordinate data of the touch point and commands by a touch on the coordinate input panel 66. In the following, a control process will be described for invalidating unnecessary coordinate data from the coordinate detecting device 1. Such a control process may be carried out by detecting false coordinate data created by a false touch on the coordinate detecting device 1 during a key entry operation and then determining key entry data other than the false coordinate data as valid data. This will be described with reference to the detailed diagram of the control part 8 shown in FIG. 4 and the flowchart shown in FIG. 5. For convenience, a "step" will be denoted as an "Su" in the following description and in FIG. 5.

Figure 6A:
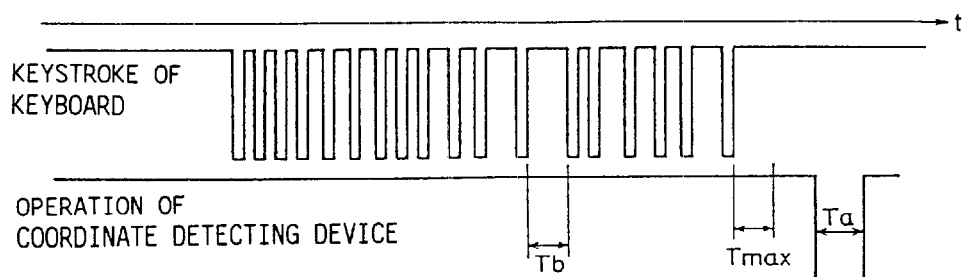
FIGS. 6A to 6C are diagrams showing an operation of the data processing apparatus according to the present invention.

First, we will consider a case where data is input to the control part 8 as shown in FIG. 6A. The data is stored in the receiving buffer 12 (S1) and then it is determined whether the data is key entry data (e.g., character data) from the keyboard 2 (S2).

If so (S2, YES), the time monitoring part 13 measures the keystroke time interval of the keyboard 2 according to the key entry data received at the receiving buffer 12 (S3). Note that the keystroke time interval is a time difference Tb between the previous reception time and the latest reception time of the key entry data (hereinafter referred to as a stroke interval).

Also, the maximum stroke interval Tmax up to that point is stored. When the stroke interval Tb does not exceed the maximum keystroke value Tmax, it is determined that the keyboard 2 is under key entry operation. The maximum keystroke value Tmax has a predetermined limit value so that the keystroke time intervals exceeding the limit value will not be stored as the maximum keystroke value Tmax. Therefore, the maximum keystroke value Tmax varies within a range below the limit value.

After monitoring the keystroke time interval Tb, the data creating part 15 creates key entry data to be sent as transmission data (S4) and then sends the transmission data to the upper layer operating system 6 and the application 7 (S5).

Figure 5:
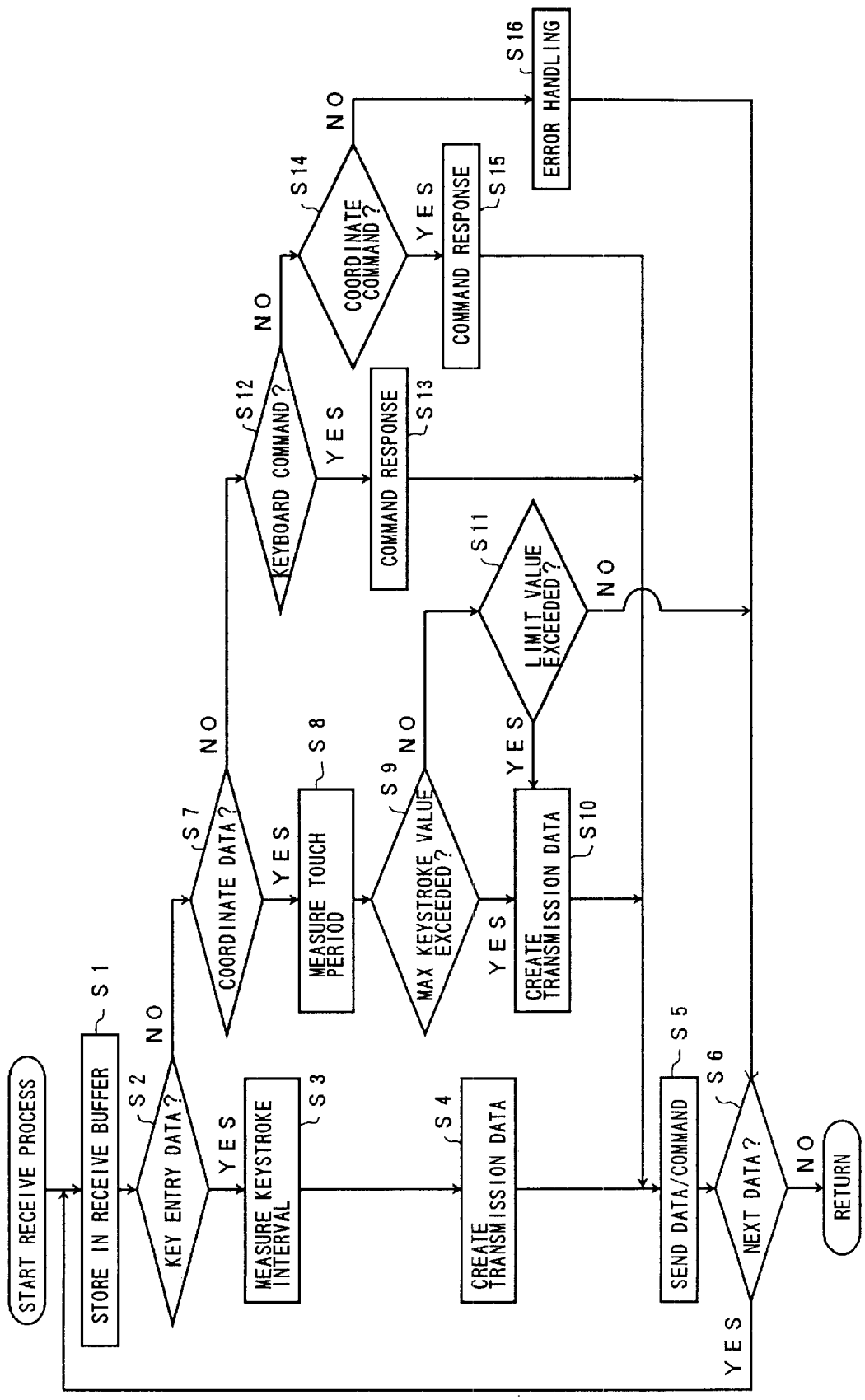
FIG. 5 is a flowchart showing an operation of a control part according to the present invention.

When there is a successive key entry operation as shown in FIG. 5 (S6, YES), the control part 8 repeats steps 1 to 6.

Secondly, we will consider a case where data is input to the control part 8 as shown in FIG. 6A after steps 1 to 6 described above. The data is stored in the receiving buffer 12 (S1) and knowing that the data is not key entry data (S2, NO), it is determined whether the data is coordinate data from the coordinate input device 1 (S7).

If so (S7, YES), the time monitoring part 13 measures the touch period of the coordinate detecting device 1 according to the coordinate data received at the receiving buffer 12 (S8). Note that the touch period is a time period Ta during which the user is actually touching the coordinate input panel (see FIG. 6A). In the data processing apparatus of the prior art, a predetermined process corresponding to the coordinate data was only carried out when Ta≧T2 (T2 being a predetermined minimum time period for recognizing a touch) and when time periods T1 and T3 (setup time and hold time for determining whether there is a touch on the coordinate input panel) were detected before and after Ta, respectively. Further, it is assumed that the time period Ta shown in FIG. 6A satisfies the condition shown in FIG. 6C.

In the data processing apparatus of the present invention, the data identification part 14 determines whether coordinate data from the coordinate Hadetecting device 1 during a key entry operation is valid according to the results obtained from measuring the keystroke interval Tb of the keyboard 2 and the touch period Ta of the coordinate detecting device 1.

Figure 6B:
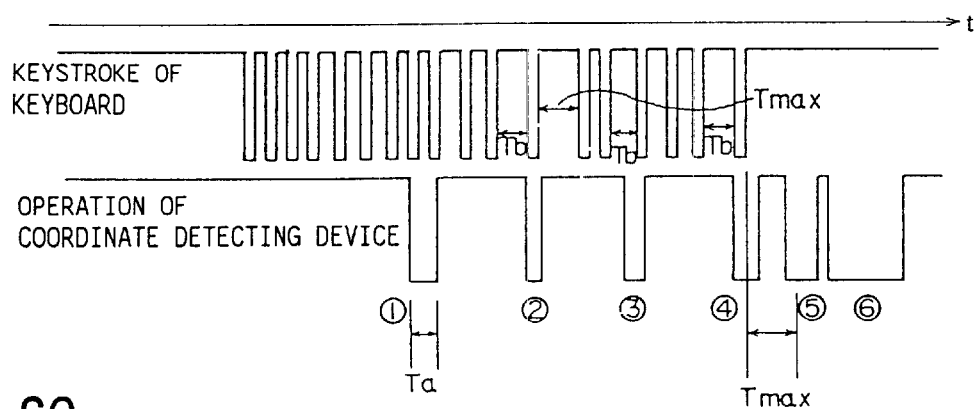
Figure 6C:
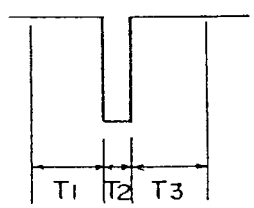

For example, in the case shown in FIG. 6A, the touch period Ta satisfies the condition shown in FIG. 6C and the keystroke interval Tb exceeds the above-described maximum keystroke value Tmax (S9, YES). In other words, the keyboard 2 is not under a key entry operation. Accordingly, the data identification part 14 determines that the coordinate data from the coordinate detecting device 1 is valid.

When it is determined that the data is valid in the data identification part 14, the data creating part 15 creates coordinate data to be sent as transmission data (S10) and then sends the transmission data to the upper layer operating system 6 and the application 7 (S5).

Further, we will consider a case where data input to the control part 8 is a command from the keyboard 2. The data is stored in the receiving buffer 12 (S1) and knowing that the data is neither key entry data (S2, NO) nor coordinate data (S7, NO), it is determined whether the data is a keyboard command from the keyboard 2 (S12). If so (S12, YES), the data is regarded as a command response (S13) and sent directly to the upper layer operating system 6 and the application 7 (S5).

Also, we will consider a case where data input to the control part 8 is a command from the coordinate detecting device 1. The data is stored in the receiving buffer 12 (S1) and knowing that the data is neither key entry data (S2, NO) nor coordinate data (S7, NO), nor a keyboard command (S12, NO), it is determined whether the data is a coordinate command from the coordinate detecting device 2 (S14). If so (S14, YES), the data is regarded as a command response (S15) and sent directly to the upper layer operating system 6 and the application 7 (S5).

If the data stored in the receiving buffer is neither one of the data described above (S2, NO), (S7, NO), (S12, NO), (S14, NO), the data processing apparatus of the present invention executes an error handling process (S16).

In the following, a process of the control part 8 will be described for a case where data is input to the control part 8 as shown in FIG. 6B. That is to say, a case where there is a touch on the coordinate input panel during the key entry operation at the keyboard 2.

For example, for ①②③④⑤ showning FIG. 6B, the receiving buffer 12 stores both the key entry data(e.g., character data) from the keyboard 2 and the coordinate data from the coordinate input device 1 (S1)(S2, YES)(S7, YES).

The time monitoring part 13 measures the keystroke interval of the keyboard 2 and the touch period of the coordinate input device 1 according to the data received in the receiving buffer 12 (S3) (S8).

After monitoring the keystroke interval, the data creating part 15 creates key entry data which will be sent as transmission data (S4) and then sends the transmission data to the upper layer operating system 6 and the application 7 (S5).

Further, in the data processing apparatus of the present invention, according to the results of monitoring the keystroke interval Tb of the keyboard 2 and the touch period Ta of the coordinate detecting device 1, the data identification part 14 determines whether the coordinate data from the coordinate detecting device 1 during a key entry operation is valid. Also, all of ①②③④⑤⑥ shown in FIG. 6B are assumed to satisfy the condition shown in FIG. 6C.

In the case of ①②③④⑤ shown in FIG. 6B, the touch period Ta satisfies the condition shown in FIG. 6C, whereas the keystroke interval Tb does not exceed the maximum stroke interval Tmax (i.e., the keyboard 2 is under a key entry operation) (S9, NO) and does not exceed the limit value (S11, NO). Therefore, the data identification part 14 determines the coordinate data from the coordinate detecting device 1 to be invalid. In other words, the data identification part 14 determines the coordinate data from the coordinate detecting device 1 to be coordinate data generated by a false touch. In this case, such coordinate data will not be sent to the upper layer operating system 6 and the application 7.

Accordingly, when there is an input to the control part 8 as shown in FIG. 6B, the valid coordinate data will only be ⑥, corresponding to a keystroke interval Tb exceeding the maximum keystroke value Tmax of the keystroke interval. This coordinate data will be sent to the upper layer operating system 6 and the application 7 (S5).

Thus, in the data processing apparatus of the present invention, it is possible to detect coordinate data which is generated by a false touch on the coordinate detecting device 1 during a key entry operation. Predetermined processes corresponding to the coordinate data are executed by the upper layer operating system 6 and the application 7 (S5) only when the data has been determined as valid coordinate data by the data identification part 14.

Figure 7:
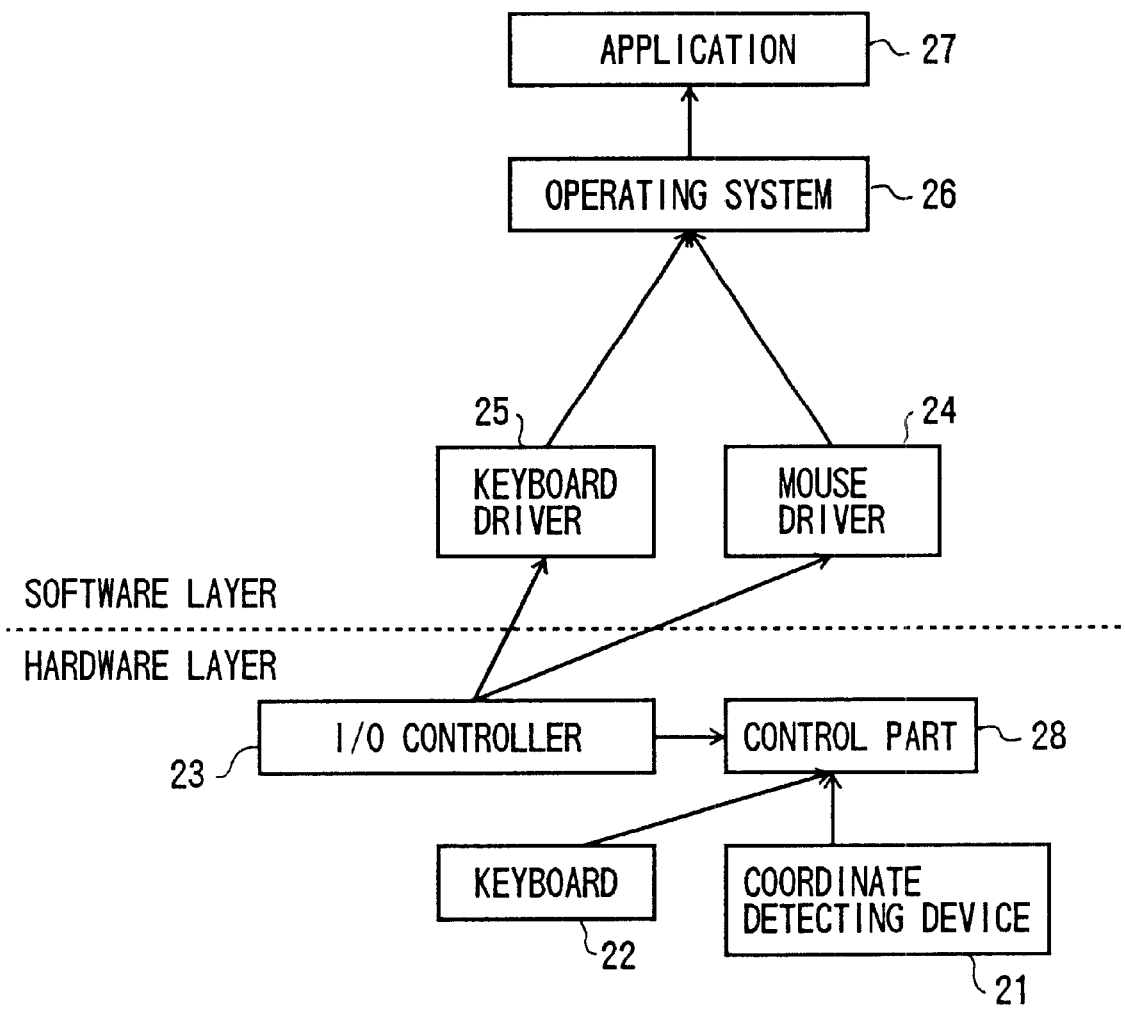
FIG. 7 is a block diagram showing a second embodiment of a data processing apparatus according to the present invention.

FIG. 7 is a block diagram showing a second embodiment of a data processing apparatus according to the present invention. The data processing apparatus of the second embodiment also includes a hardware layer and a software layer, as in the first embodiment shown in FIG. 3. The hardware layer receives data generated by an operation of the user, which may be referred to as coordinate data and key entry data. The software analyzes the received data and then executes predetermined processes corresponding to the data.

The above-described hardware layer of the present embodiment includes a coordinate detecting device 21 for generating coordinate data of a touch point by a touch on a coordinate input panel, a keyboard 22 for generating key entry data by pressing down a key of the keyboard 22, a control part 28 for receiving coordinate data from the coordinate detecting device 21 and key entry data from the keyboard 22 and subsequently executing a control for invalidating unnecessary coordinate data and an I/O controller 23 for communicating the coordinate data and the key entry data from the control part to the software layer.

The software layer includes a mouse driver 24 and a keyboard driver 25. The mouse driver 24 converts the coordinate data from the hardware layer into valid data corresponding to an operating system 26 and an application 27. The keyboard driver 25 converts the key entry data from the hardware layer into valid data corresponding to the operating system 26 and the application 27.

Also, in order to invalidate unnecessary coordinate data from the coordinate detecting device 21, the control part 28 of the present embodiment operates as follows. For example, the control part 28 detects false coordinate data generated by a false touch on the coordinate detecting device 21 during a key entry operation and then controls key entry data other than the false coordinate data as valid data.

The control part 28 for enabling the above-described control will not be described in detail since the control part 28 has a similar structure and function to those of the control part 8 shown in FIG. 3.

Also, the processing operation of the data processing apparatus shown in FIG. 7 will not be described in detail since the processing operation is similar to the processing operation shown in the flowchart of FIG. 5.

Therefore, the data processing apparatus of the present embodiment, as that of the embodiment shown in FIG. 3, can detect coordinate data generated by a false touch on the coordinate input panel 21 during a key entry operation. A predetermined process corresponding to the coordinate data will be executed by the upper layer operating system 26 and application 27, only when the coordinate data is determined as valid coordinate data by the data identification part 14.

Figure 8:
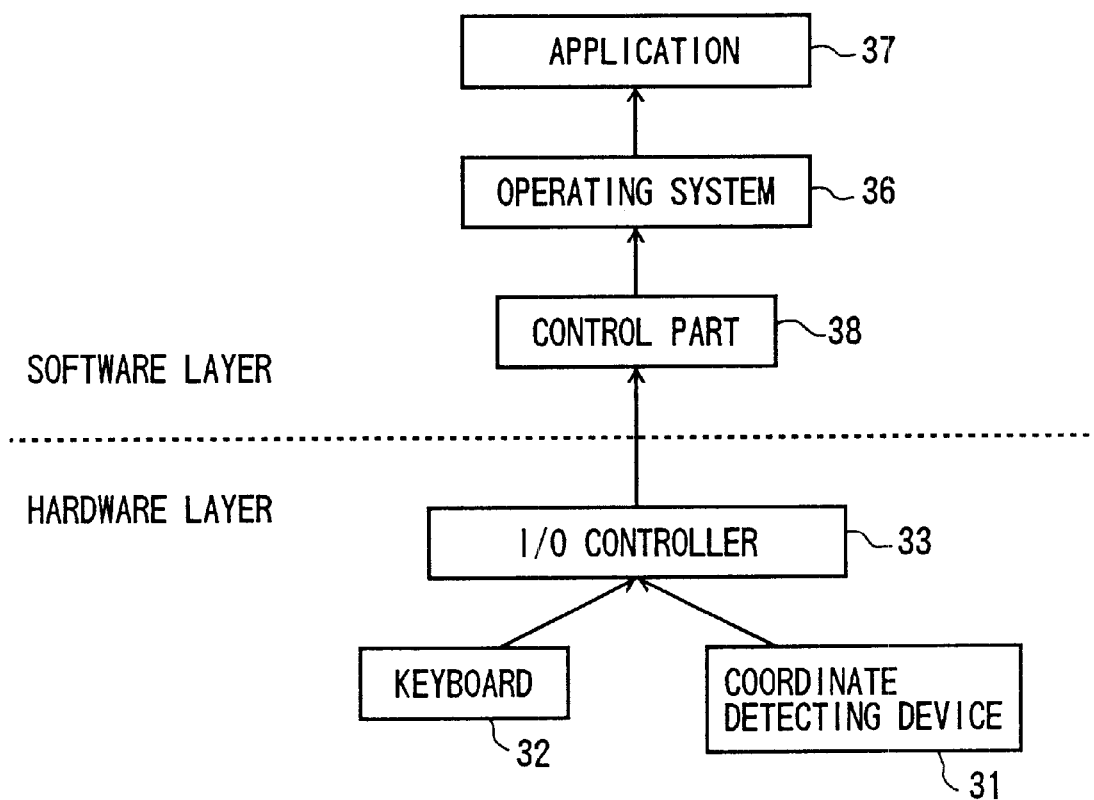
FIG. 8 is a block diagram showing a third embodiment of a data processing apparatus according to the present invention.

FIG. 8 is a block diagram showing a third embodiment of a data processing apparatus, which is an improved version of the first embodiment. The data processing apparatus of the third embodiment also includes a hardware layer and a software layer, as the first embodiment shown in FIG. 3. The hardware layer receives data generated by an operation of the user, which may be referred to as coordinate data and key entry data. The software analyzes the received data and then executes predetermined processes corresponding to the data.

The above-described hardware layer of the present embodiment includes a coordinate detecting device 31 for generating coordinate data of a touch point by a touch on a coordinate input panel, a keyboard 32 for generating key entry data by pressing down a key of the keyboard 32, and an I/O controller 33 for communicating the coordinate data from the coordinate detecting device 31 and the key entry data from the keyboard 32 to the software layer. The coordinate detecting device 31, the keyboard 32 and the I/O controller 33 correspond to the coordinate detecting device 1, the keyboard 2 and the I/O controller 3, respectively.

The software layer includes a control part 38 formed by combining a mouse driver 4 and a keyboard driver 5 of FIG. 3. The control part 38 converts the coordinate data and the key entry data from the hardware layer into valid coordinate data and key entry data corresponding to an operating system 36 and an application 37.

Also, in order to invalidate unnecessary coordinate data from the coordinate detecting device 31, the control part 38 of the present embodiment operates as follows. For example, the control part 38 detects false coordinate data generated by a false touch on the coordinate input panel during a key entry operation and then controls key entry data other than the false coordinate data as valid data.

The control part 38 for enabling the above-described control will not be described in detail since the control part 38 has a similar structure and function to those of the control part 8 described with reference to FIG. 3.

Also, the processing operation of the data processing apparatus shown in FIG. 8 will not be described in detail since the processing operation is similar to the processing operation shown in the flowchart of FIG. 5.

Therefore, the data processing apparatus of the present embodiment has a similar effect to that of the embodiment shown in FIG. 3, and differs from the embodiment shown in FIG. 3 as described below.

In the data processing apparatus of the first embodiment shown in FIG. 3, standard drivers such as the mouse driver 4 and the keyboard driver 4 will keep operating even when there is a failure in a program for operating the control part 8. Therefore, the data processing apparatus of the first embodiment shown in FIG. 3 has an advantage that it does not suffer from a failure relevant to the device as a whole.

The data processing apparatus of the third embodiment shown in FIG. 8 has a structure such that elements equivalent to the mouse driver 4, the keyboard 5 and the control part 8 in FIG. 3 are combined. Therefore, the data processing apparatus of the third embodiment shown in FIG. 8 has an advantage that the operation of the device can be centrally managed at the control part 38.

Figure 9:
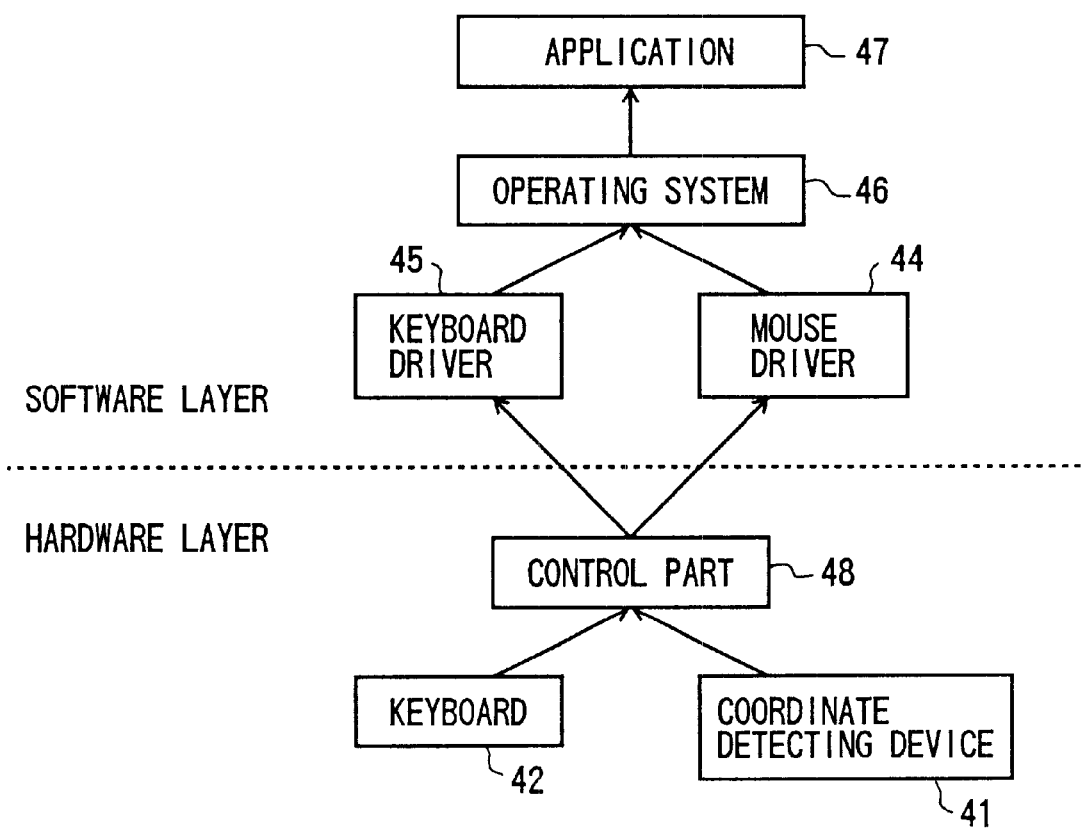
FIG. 9 is a block diagram showing a fourth embodiment of a data processing apparatus according to the present invention.

FIG. 9 is a block diagram showing a fourth embodiment of a data processing apparatus according to the present invention. The data processing apparatus of the fourth embodiment also includes a hardware layer and a software layer, as in the first embodiment shown in FIG. 3. The hardware layer receives data generated by an operation of the user, which may be referred to as coordinate data and key entry data. The software analyzes the received data and then executes predetermined processes corresponding to the data.

The above-described hardware layer of the present embodiment includes a coordinate detecting device 41 for generating coordinate data of a touch point by a touch on a coordinate input panel, a keyboard 42 for generating key entry data by pressing down a key of the keyboard 42, and a control part 48 constructed by combining the I/O controller 23 and the control part 28 shown in FIG. 7. The control part 48 receives coordinate data from the coordinate detecting device 41 and key entry data from the keyboard 42, executes a control for invalidating unnecessary coordinate data from the coordinate detecting device 41 and then communicates valid coordinate data and key entry data to the software layer.

The software layer includes a mouse driver 44 and a keyboard driver 45 which correspond to the mouse driver 24 and the keyboard driver 25 shown in FIG. 7, respectively. The mouse driver 44 converts the coordinate data from the hardware layer into valid data corresponding to an operating system 46 and an application 47. The keyboard driver 45 converts the key entry data from the hardware layer into valid data corresponding to the operating system 46 and the application 47.

Also, in order to invalidate unnecessary coordinate data from the coordinate detecting device 41, the control part 48 of the present embodiment operates as follows. For example, the control part 48 detects false coordinate data generated by a false touch on the coordinate input panel during a key entry operation and then controls key entry data other than the false coordinate data as valid data.

The control part 48 for enabling the above-described control will not be described in detail since the control part 48 has a similar structure and function to those of the control part 8 described with reference to FIG. 3.

Also, the processing operation of the data processing apparatus shown in FIG. 9 will not be described in detail since the processing operation is similar to the processing operation shown in the flowchart of FIG. 5.

In the data processing apparatus of the first embodiment shown in FIG. 5, a standard I/O controller such as the I/O controller 23 will keep operating even when there is a failure in a program for operating the control part 28. Therefore, the data processing apparatus of the first embodiment shown in FIG. 5 has an advantage that it does not suffer from a failure relevant to the device as a whole.

The data processing apparatus of the third embodiment shown in FIG. 9 has a structure such that elements equivalent to the I/O controller 23 and the control part 28 in FIG. 7 are combined. Therefore, the data processing apparatus of the third embodiment shown in FIG. 9 has an advantage that the operation of the device can be centrally managed by the control part 48.

FIG. 12 is a block diagram showing an entire structure of a data processing apparatus according to the present invention. As shown in FIG. 12, the data processing apparatus of the present invention is constructed by a control unit 401 including a CPU, a memory unit 402, a display unit 403, an input unit 404, a CD-ROM drive unit 405 and a disk unit 406. Each of these units is connected via a system bus A. For example, after detecting false coordinate data created by a false touch on the coordinate input panel during a key entry operation, the data processing apparatus executes a process for controlling key entry data other than false coordinate data as valid data.

The control unit 401 detects false coordinate data generated by a false touch on the coordinate input panel during a key entry operation and executes a program for controlling key entry data other than the false coordinate data as valid data. The control unit 401 corresponds to the respective control parts shown in FIG. 3, FIG. 7, FIG. 8 and FIG. 9.

The memory unit 402 includes memories such as a RAM and a ROM, so as to store programs to be executed by the control unit 401 and necessary data obtained during the process.

The display unit 403 is constructed by a CRT or a LCD(Liquid Crystal Display) and displays various visual information.

The input unit 404 is constructed by the respective keyboards shown in FIG. 3, FIG. 7, FIG. 8 and FIG. 9.

A CD-ROM 500 stores a program for detecting false coordinate data generated by a false touch on the coordinate input panel during a key entry operation and then controlling key entry data other than the false coordinate data as valid data.

The program is installed in the disk unit 406 from the CD-ROM 500 set in the CD-ROM drive unit 405. Subsequently, when starting up the data processing apparatus, the program read out from the disk unit 406 will be stored in the memory unit 402. In this state, the control unit 401 (the CPU) detects false coordinate data created by a false touch on the coordinate input panel during a key entry operation, and then executes a process for controlling key entry data other that the false coordinate data as valid data.

In FIG. 12, the above-described program is provided on the CD-ROM 500. However, the storage medium of the program is not limited to the CD-ROM and can be any type of storage medium which may be one of a magnetic disk such as a floppy-disk, an optical disk and a magnetic tape corresponding to a type of computer constituting a system.

Further, the present invention is not limited to these embodiments, but variations and modifications may be made without departing from the scope of the present invention.

The present application is based on Japanese priority application No.10-002603 filed on Jan. 8, 1998, the entire contents of which are hereby incorporated by reference.

What is claimed is:

1. A data processing apparatus, comprising:
   a coordinate detecting device outputting coordinate data of a touch point generated by a touch on a coordinate input panel;
   a keyboard outputting key entry data;
   a processor executing predetermined processes corresponding to the coordinate data and the key entry data; and
   a control element detecting false coordinate data generated by a false touch on the coordinate input panel during a key entry operation and controlling key entry data other than the false coordinate data as valid data, without disabling operation of said coordinate detecting device, wherein said control element comprises
      a receiving element receiving both the key entry data from said keyboard and the coordinate data from said coordinate detecting device;
      a time monitoring element monitoring a keystroke time interval of said keyboard and a touch period of said coordinate detecting device; and
      a determination element determining whether the coordinate data from said coordinate detecting device during a key entry operation is valid coordinate data on the basis of the keystroke time interval and the touch period, by comparing the keystroke time interval to the touch period,
   said processor receiving the valid coordinate data and executing corresponding processes.

2. The data processing apparatus as claimed in claim 1, wherein the control element comprises computer readable program code means causing said processor to receive the valid data and execute corresponding processes.

3. A computer usable medium, comprising:

first computer readable program code means causing a data processing apparatus to execute predetermined processes corresponding to coordinate data and key entry data; and second computer readable program code means causing the data processing apparatus to detect false coordinate data generated by a false touch on a coordinate input panel during a key entry operation and to control key entry data other than the false coordinate data as valid data, without disabling operation of the coordinate detecting device, by comparing a keystroke time interval of a keyboard to a touch period of the coordinate input panel.

4. The computer usable medium as claimed in claim 3, further comprising:

third computer readable program code means causing the data processing apparatus to receive both the key entry data from a keyboard and the coordinate data from a coordinate detecting device;

fourth computer readable program code means causing the data processing apparatus to monitor a keystroke time interval of the keyboard and a touch period of the coordinate detecting device; and fifth computer readable program code means causing the data processing apparatus to determine whether the coordinate data from the coordinate detecting device during a key entry operation is valid coordinate data on the basis of the keystroke time interval and the touch period.

5. A computer program product for use with a data processing apparatus, comprising:

a coordinate detecting device outputting coordinate data of a touch point generated by a touch on a coordinate input panel;

a keyboard outputting key entry data;

a processor executing predetermined processes corresponding to the coordinate data and the key entry data; and a memory storing computer readable program code means causing said processor to detect false coordinate data generated by a false touch on the coordinate input panel during a key entry operation and to control key entry data other than the false coordinate data as valid data, without disabling operation of the coordinate detecting device, by comparing a keystroke time interval of a keyboard to a touch period of the coordinate input panel.

6. The computer program product as claimed in claim 5, wherein said memory comprises:

second computer readable program code means causing the data processing apparatus to receive both the key entry data from said keyboard and the coordinate data from said coordinate detecting device;

third computer readable program code means causing the data processing apparatus to monitor a keystroke time interval of said keyboard and a touch period of said coordinate detecting device; and fourth computer readable program code means causing the data processing apparatus to determine whether the coordinate data from said coordinate detecting device during a key entry operation is valid coordinate data on the basis of the keystroke time interval and the touch period.

7. A method in a computer system executing predetermined processes corresponding to coordinate data from a coordinate detecting device having a data input panel and key entry data from a keyboard, detecting false coordinate data generated by a false touch on the coordinate input panel during a key entry operation, and controlling key entry data other than the false coordinate data as valid data, comprising:

receiving both the key entry data from the keyboard and the coordinate data from the coordinate detecting device;

monitoring a keystroke time interval of the keyboard and a touch period of the coordinate detecting device; and determining whether the coordinate data from the coordinate detecting device during a key entry operation is valid coordinate data on the basis of the keystroke time interval and the touch period, without disabling operation of the coordinate detecting device, by comparing the keystroke time interval of the keyboard to the touch period of the coordinate input panel.

8. A data processing apparatus with a coordinate input panel for generating touch point coordinate data and a keyboard for generating key entry data, comprising a control element detecting false coordinate data generated by a false touch on the coordinate input panel during a key entry operation and controlling key entry data other than the false coordinate data as valid data, without disabling operation of the coordinate detecting device, by comparing a keystroke time interval of a keyboard to a touch period of the coordinate input panel.

9. A method for detecting false coordinate data generated by erroneously touching a coordinate input device, comprising:

receiving, during a key entry operation, key entry data from a keyboard and coordinate data from a coordinate detecting device;

monitoring a keystroke time interval of the keyboard and a touch period of the coordinate detecting device; and determining whether the coordinate data is valid using the keystroke time interval and the touch period, without disabling operation of the coordinate detecting device, by comparing the keystroke time interval of the keyboard to the touch period of the coordinate input panel.

* * * * *